Aug. 25, 1959 R. D. DENING 2,900,883
DEVICE FOR KNEADING AND SURFACING PLASTIC MATERIAL
Filed March 8, 1954

INVENTOR:
R. D. DENING,
BY
O O Martin
ATTORNEY.

United States Patent Office 2,900,883
Patented Aug. 25, 1959

2,900,883

DEVICE FOR KNEADING AND SURFACING PLASTIC MATERIAL

Robert D. Dening, Montebello, Calif., assignor to Garlinghouse Brothers, Los Angeles, Calif., a co-partnership Application March 8, 1954, Serial No. 414,550

10 Claims. (Cl. 94—45)

The present invention relates to a device for leveling and smoothing plastic surfaces, such as newly laid concrete.

It is the object of the invention to provide a simple and conveniently operable troweling machine which may be depended upon effectively to perform such leveling operation. Another object is to provide on the device means for preliminarily leveling the material as the machine is advanced along the surface to be troweled. A further object is to provide in a device of this type suitable shock absorbing means to the end that all danger of impairing any portion of the device may be eliminated.

Also included among the objects of the invention is to provide a power operated motion converting device which is adapted to convert an input rotary motion into a resulting motion, the effective direction of which is productive of basic and resultant forces acting generally in the same direction as the axis of input motion, the conversion being accompanied by an increase in force on an appropriate work element by virtue of which operations such as compacting, mixing, tamping, cutting and kneading can be performed with a high degree of effectiveness under a great variety of conditions.

Included further among the objects of the invention is to provide a new and improved mechanical power and direction converter train of greatly simplified construction wherein rotary motion prevails at one end of the converter train and reciprocating motion prevails at the other end.

These and other objects of the invention will appear upon perusal of the following detailed description and by referring to the accompanying drawing in which a simple form of the invention is illustrated.

Figure 1:
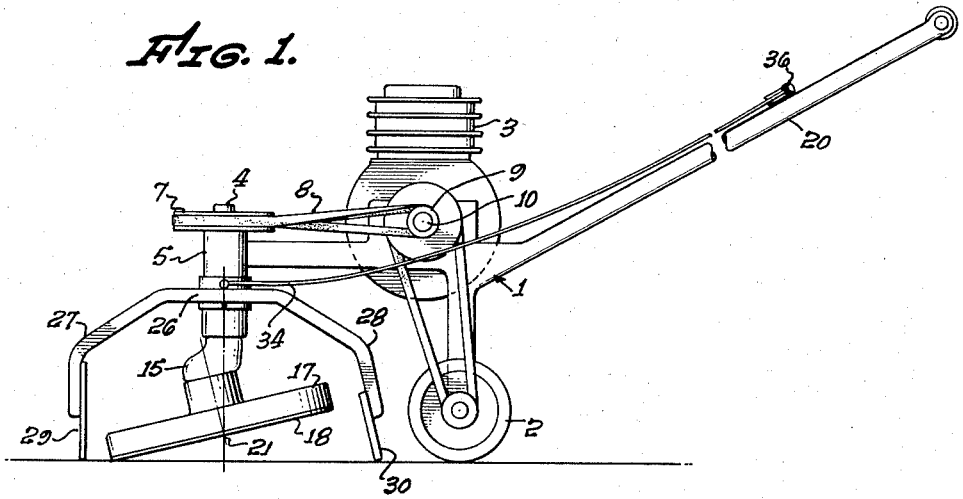
Fig. 1 is a side elevational view of a device embodying the invention.
Figure 2:
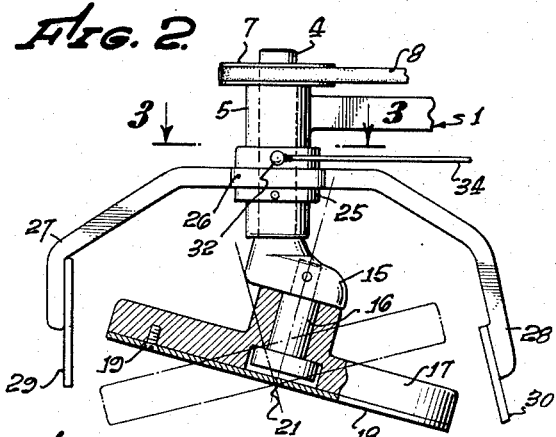
Fig. 2 is a side elevational view similar to Fig. 1 drawn to a larger scale showing the front portion thereof partially broken away to show the interior structure.
Figure 4:
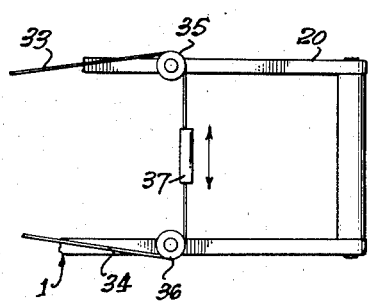
Fig. 4 illustrates another feature of the device.
Figure 3:
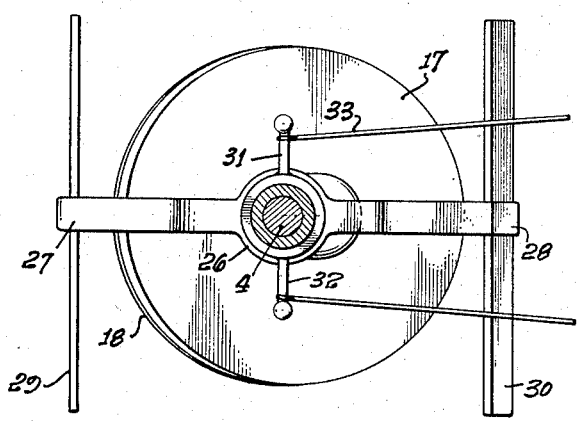
Fig. 3 is a plan view of most of the parts shown in Fig. 2.

In the embodiment of the invention illustrated in the drawings I have shown a carriage 1 mounted on wheels 2 to support a motor 3. A shaft 4 is vertically seated for rotation in a bearing 5 at the front end of the carriage and it is in any suitable manner connected for rotation by the motor at low speed. This connection is in the drawings for the sake of simplicity shown to include a relatively large pulley 7 and a belt 8 extending therefrom to a small pulley 9 on the motor shaft 10.

The lower end of shaft 4 is enlarged to form an inclined head 15 in which a short stem 16 is rigidly mounted rotatably to support thereon a circular bracket 17. A disk 18 is by screws 19 fastened to the bottom surface of the bracket to form the trowel blade or work shoe of the device.

An operating handle 20 is shown upwardly and rearwardly extending from the carriage and this handle may be manipulated to propel the device along a plastic ground surface as required for the troweling operation. When the motor is energized to rotate the shaft 4 during the advance movement of the carriage, it is found that a peculiar undulating movement is imparted to the trowel blade. When it is considered that the bracket and blade are able to rotate on the stem 16 it will be appreciated that the speed of rotative movement will be governed by the resistance offered by the plastic material the device is operated to trowel. In the embodiment chosen for illustration frictional resistance offered to movement of the blade by the concrete or other material being worked by the device results in rotation of the stem 16 relative to the bracket 17 inasmuch as the bracket is freely pivotal on the stem. Progress of the blade relative to the surface worked therefore lags with respect to rotation of the head 15. A most peculiar and highly effective kneading action is in this manner obtained. In order to insure perfect balance of the component parts during the operation of the trowel the parts are so arranged that the center line through the axle 4 intersects the trowel axis at the bottom of the blade 18, as indicated at 21 in Fig. 1.

The front end of the carriage is shown downwardly extended to form a cylindrical seat 25 for a horizontally directed bracket 26, the ends 27, 28 of which are shown downwardly bent and a pair of leveling blades 29, 30 are clamped in position on the ends of the bracket, substantially as indicated in the drawing. The purpose of these blades is to assist in leveling the ground surface as the troweling operation proceeds. Arms 31, 32 project laterally from the bracket and cords 33, 34 extend from the ends of these arms to a convenient position at the end of the operating handle 20. Illustrative of such connection, the cords are shown bent over pulleys 35, 36 of the handle and a hand grip 37 is suitably fastened to the ends of the cords. The operator can take hold of this hand grip during the troweling operation and move it to swing the bracket 26 on its bearing thereby to adjust the angular positions of the leveling blades as may be required to produce perfect leveling of the ground surface.

Since the nature, composition and extent of the surface to be troweled may vary considerably it is to be understood that the type of carriage and motor as well as the speed of trowel blade rotation must be designed to suit each particular type of job and that the above described mechanism is merely illustrative of a very simple combination capable of performing troweling operations in accordance with the invention.

Figure 5:
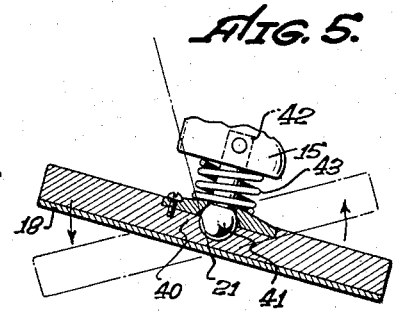
Fig. 5 is added to show a manner in which shock absorbing means may be embodied in the device.

It is also to be considered that the material of the ground surface to be troweled may be of such nature that, at times, sudden obstructions may be encountered as where in troweling a concrete surface and accumulation of cement-bound rocks may be found imbedded in the surface. Should the troweling disk, while the carriage is advanced at fair speed, suddenly run into such somewhat solidified obstruction, serious damage to the component parts of the device might result. It is, as above stated, an object of the invention to provide safeguards against such damage and this may be done in the manner illustrated in Fig. 5 of the drawings.

The trowel blade bracket 40 is in this case shown mounted on the spherical head 41 of a stem 42 which takes the place of the above described stem 16. The space between the head 41 and the head 15 is made high enough to afford room therein for a very powerful compression spring 43 of a length snugly to fit into this space, Ordinarily, this spring will function as a solid spacer and will not interfere with normal operation of the device. Should, however, such obstruction suddenly be encountered it is found that the spring will be capable of yielding to permit the trowel blade bracket to swing on the spherical head 41 and so to eliminate the danger of damaging other parts of the device.

While the drawing shows the device of the invention mounted on a very simple form of manually operable truck or pushcart, it is to be understood that it may be embodied in much larger, power operated road grading and leveling machines. The device has also been found admirably adapted for embodiment in ditching machines for use in leveling and smoothening the sloping, concrete lined side surfaces of irrigation ditches. In such cases, it may be found advisable to leave out the leveling blades 29, 30 and the manual control mechanism therefor.

I claim:

1. A surfacing device comprising, a carriage, a vertically directed bearing at the front end of the carriage, a shaft vertically mounted for rotation in said bearing, the shaft terminating at the lower end thereof in an inclined head, a stem projecting perpendicularly from the inclined surface at said head at a location removed from the axis of the shaft, a disk-shaped kneading element rotatably mounted for unrestricted rotation relative to the stem, a frame mounted for manual rotation on the bearing, leveling blades on said frame, power means on the carriage, and connections from said means for rotating the shaft at the required speed.

2. A surfacing device comprising, a carriage having a handle thereon, a vertically directed bearing at the front end of the carriage, a shaft mounted for rotation in said bearing, the shaft terminating at the lower end thereof in a head having an inclined surface, a stem projecting perpendicularly from the inclined surface of said head, a disk-shaped kneading element rotatably mounted on the stem for unrestricted rotation relative thereto, a frame mounted for rotation on said bearing, leveling blades on said frame, elements extending from said handle to the said frame for manually adjusting the frame and leveling blades, power means on the carriage, and connections from said means for rotating the shaft at the required speed.

3. A surfacing device comprising, a carriage having a handle thereon, a vertically directed bearing at the front end of the carriage, a shaft mounted for rotation in said bearing, the shaft terminating at the lower end thereof in a head and an inclined surface on the head, a stem projecting from the inclined surface of said head at a location removed from the axis of the shaft, a disk-shaped kneading element mounted for rotation on the stem, a frame mounted for rotation on said bearing, leveling blades on said frame, elements extending from said handle to the said frame for manually adjusting the frame and leveling blades, shock absorbing means between the element and head, power means on the carriage, and connections from said means for rotating the shaft at the required speed.

4. A surfacing device comprising, a carriage having a handle thereon, a vertically directed bearing at the front end of the carriage, a shaft mounted for rotation in said bearing, the shaft terminating at the lower end thereof in a head and an inclined surface on the head, a stem projecting from the inclined surface of said head at a location removed from the axis of the shaft, a disk-shaped kneading element rotatably mounted on the stem, a frame mounted for rotation on said bearing, leveling blades on said frame, arms laterally extending from opposite sides of the frame, cords extending from said arms to the handle for manual operation to swing the frame on the bearing, power means on the carriage, and connections from said power means for rotating the shaft at the required speed.

5. A surfacing device comprising, a carriage having a handle thereon, a vertically directed bearing at the front end of the carriage, a shaft mounted for rotation in said bearing, the shaft terminating at the lower end thereof in a head and an inclined surface on the head, a stem projecting from the inclined surface of said head at a location removed from the axis of the shaft, a disk-shaped kneading element rotatably mounted on the stem, a frame rotatably mounted on said bearing, leveling blades on said frame, arms laterally extending from opposite sides of the frame, cords extending from said arms to the handle for manual operation to swing the frame on the bearing, shock absorbing means between the element and the head, power means on the carriage, and connections from said power means for rotating the shaft at the required speed.

6. A device for working a material on a surface comprising a carriage, means adapted to support said carriage on the surface, a shaft vertically mounted for rotation on said carriage, the shaft terminating at the lower end thereof in a head and an inclined bearing area on the head, a stem projecting from the inclined bearing area of said head at a location removed from the axis of the shaft, a material working element rotatably mounted on the stem for unrestricted rotation relative thereto, said material working element being adapted to engage the material on the surface and effect a wobble motion on rotation of the shaft, a universal connection between the end of the stem and said material working element including a universal cushioning element around said stem acting in one direction against said last element and acting in an opposite direction against said head in shock absorbing relationship between the material working element and the head, power means on the carriage, and connections from said power means for rotating the shaft.

7. A device for compacting compactible material comprising a support for supporting said compacting device relative to the surface of said material being compacted, a shaft rotatably mounted on the support and having an axis of rotation thereon, a head element at a free end of the shaft offset laterally of the axis of the shaft, a thrust bearing surface on said head element inclined at an angle relative to the axis of the shaft, a compacting disk having a working face, and having a thrust bearing face in rotatable engagement with said bearing surface at an oblique axis of rotation relative to the shaft, a stem normal to said thrust bearing surface for rotatably mounting said compacting disk on said oblique axis, said oblique axis having a point of intersection with the axis of the shaft substantially at a location which is spaced from said shaft a distance which is at least equal to the distance of the center of the working face of said disk from the shaft.

8. A device for compacting compactible material in accordance with claim 7, in which said support comprises a laterally extending frame element rotatably supporting said shaft, a downwardly extending element mounted on said frame element in spaced relation from said shaft, and means on said downwardly extending element to movably support said disk.

9. A device for compacting compactible material in accordance with claim 7, in which said support comprises a laterally extending frame element rotatably supporting said shaft, a downwardly extending element mounted on said frame element in spaced relation from said shaft, rolling and pivoting means on said downwardly extending element, and an adjusting member connected to said support, whereby to position said compacting disk at different levels relative to the surface being compacted and whereby to position said compacting disk at different locations about the surface being compacted.

10. A device for compacting compactible material comprising a support for supporting said compacting device relative to the surface of said material being compacted, a shaft rotatably mounted on the support and having an axis of rotation thereon, a rotatable connection between the shaft and the support adapted to convey endwise thrust on the shaft, a head element at a free end of the shaft having a location offset laterally of the axis of the shaft, a bearing surface on said head element inclined at an oblique angle relative to the axis of the shaft, a compacting disk having a working face, and having a bearing face in rotatable engagement with said bearing surface, said compacting disk having an oblique axis of rotation relative to the shaft, a stem normal to said bearing surface for rotatably mounting said compacting disk on said oblique axis, said axes having a point of intersection at a location substantially coincident with the center of the working face of said compacting disk, and power means on the support operably connected to said shaft.

References Cited in the file of this patent

UNITED STATES PATENTS

| | | |
|---|---|---|
| 20,980 | Weeks | July 20, 1858 |
| 1,085,505 | Stafford | Jan. 27, 1914 |
| 1,828,576 | Palatini | Oct. 20, 1931 |
| 2,084,983 | Baily | June 29, 1937 |
| 2,149,668 | Crosthwaite | May 7, 1939 |
| 2,234,831 | Porter | Mar. 11, 1941 |
| 2,451,455 | Willson | Oct. 12, 1948 |
| 2,468,981 | Huffman | May 3, 1949 |
| 2,489,041 | Manseau | Nov. 22, 1949 |
| 2,659,281 | Lucas | Nov. 17, 1953 |

FOREIGN PATENTS

| | | |
|---|---|---|
| 112,004 | Great Britain | Feb. 21, 1918 |
| 639,457 | Germany | Dec. 5, 1936 |